United States Patent
Matsumoto et al.

(10) Patent No.: US 7,801,537 B2
(45) Date of Patent: Sep. 21, 2010

(54) IMAGE PROVIDING APPARATUS AND IMAGE PROVIDING SYSTEM

(75) Inventors: Fumiaki Matsumoto, Higasiosaka (JP); Michiyuki Yamaoka, Katano (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 10/482,263

(22) PCT Filed: Feb. 27, 2002

(86) PCT No.: PCT/JP02/01773

§ 371 (c)(1), (2), (4) Date: Jun. 28, 2004

(87) PCT Pub. No.: WO03/003781

PCT Pub. Date: Jan. 9, 2003

(65) Prior Publication Data

US 2004/0235494 A1 Nov. 25, 2004

(30) Foreign Application Priority Data

Jun. 27, 2001 (JP) .............................. 2001-195291

(51) Int. Cl.
 *H04W 24/00* (2009.01)
 *H04W 4/00* (2009.01)
 *H04M 3/42* (2006.01)
 *H04M 1/725* (2006.01)
(52) U.S. Cl. ................. 455/456.3; 455/456.1; 455/466; 455/457; 455/414.2; 455/412.1
(58) Field of Classification Search ... 455/456.1–456.6, 455/414.1–414.2, 457, 466; 370/475
See application file for complete search history.

(56) References Cited

U.S. PATENT DOCUMENTS

| | | | | |
|---|---|---|---|---|
| 5,717,506 A | * | 2/1998 | Yamamoto et al. | 358/523 |
| 6,662,016 B1 | * | 12/2003 | Buckham et al. | 455/457 |
| 6,810,323 B1 | * | 10/2004 | Bullock et al. | 701/206 |
| 6,819,919 B1 | * | 11/2004 | Tanaka | 455/414.1 |
| 6,865,191 B1 | * | 3/2005 | Bengtsson et al. | 370/475 |
| 2001/0017668 A1 | * | 8/2001 | Wilcock et al. | 348/552 |
| 2001/0019359 A1 | * | 9/2001 | Parulski et al. | 348/207 |
| 2001/0055983 A1 | * | 12/2001 | Ohmura et al. | 455/566 |
| 2002/0026289 A1 | * | 2/2002 | Kuzunuki et al. | 702/150 |
| 2003/0060211 A1 | * | 3/2003 | Chern et al. | 455/456 |

FOREIGN PATENT DOCUMENTS

| | | | |
|---|---|---|---|
| EP | 1 081 901 A1 | | 3/2001 |
| EP | 1081901 A1 | * | 3/2001 |
| JP | 2001-075881 | * | 3/2001 |
| JP | 2001-75881 | | 3/2001 |

* cited by examiner

*Primary Examiner*—Vincent P Harper
*Assistant Examiner*—Ariel Balaoing

(57) ABSTRACT

An image provision device that provides an image exhibiting a distinctive feature of a locality to an address. On receipt from a mobile telephone (1a) of a position information mail (21) storing position information of the mobile telephone (1a), the image provision device transmits to the mobile telephone (1a) a reply mail (39) storing thumbnail images created based on the position information in the position information mail (21). Then, on receipt from the mobile telephone (1a) of an image select mail (22) storing a selection resulting from one thumbnail image from the thumbnail images being selected, the image provision device transmits to the address an image mail (40) storing an image based on the selection result in the image select mail (22).

22 Claims, 13 Drawing Sheets

FIG.5

| POSITIONAL AREA | IMAGE ID | IMAGE ID | IMAGE ID | IMAGE ID |
|---|---|---|---|---|
| 36° △△'N - 138° ○△'E ~ 36° ×△'N - 138° ×○'E | SNOWMAN.ID | ○×PARK.ID | △△ARTMUSEUM.ID | |
| 36° ×△'N - 138° ○△'E ~ 36° ○×'N - 138° △×'E | ○○CASTLE.ID | ×△△TEMPLE.ID | ×△△ZOO.ID | |
| . . . . | . . . . | . . . . | . . . . | |

| TRANSMISSION SOURCE ADDRESS | TRANSMISSION TARGET ADDRESS | MAIL BODY | THUMBNAIL IMAGE | IMAGE ID | THUMBNAIL IMAGE | IMAGE ID | THUMBNAIL IMAGE | IMAGE ID |
|---|---|---|---|---|---|---|---|---|
| XXX@ ghi.xz.jp | ○○○@ abc.xy.jp | | SNOWMAN | SNOWMAN .ID | ○× PARK | ○×PARK .ID | △△ ART MUSEUM | △△ ARTMUSEUM .ID |

39

IMAGE PROVIDING APPARATUS AND IMAGE PROVIDING SYSTEM

TECHNICAL FIELD

The present invention relates principally to an image provision device and an image provision system that are applicable in electronic mail transmission from a mobile terminal.

BACKGROUND ART

Nowadays mobile telephones often have an electronic mail function, and are able to transmit/receive electronic mail (hereinafter, simply "mail") using key operations and so forth. Due to the portability and convenience of mobile telephones, many users take their mobile telephone with them when they go out for the day or on holiday. As such, users can easily send mails to friends from holiday destinations, for instance.

However, with conventional mails, the user's mails consist of text messages, even when sent from holiday destinations, and images that allow the locality of transmission (scenic spot, tourist resort, etc.) to be identified are not appended.

In spite of this, there are users who would like to send images to friends exhibiting distinctive features of localities, as is the case with postcards. While it is possible, for example, to send images to friends if the user stores many images on their mobile telephone, this is not desirable since mobility is adversely affected by increases in the mobile telephone's memory volume.

DISCLOSURE OF THE INVENTION

The present invention aims to provide an image provision device and an image provision system that provide images exhibiting distinctive features of a locality to friends, for example, without requiring mobile terminals to hold a large number of images.

An image provision device of the present invention that achieves the above object includes: a reception unit operable to receive from a mobile terminal an address to which an image is to be provided; a position-information acquiring unit operable to acquire position information relating to a locality; an image specifying unit operable to specify, based on the position information, a plurality of images relating to the position information; a transmitting unit operable to transmit information relating to the specified plurality of images to the mobile terminal; a receiving unit operable to receive, from the mobile terminal, information relating to one of the images selected from the transmitted information; and an image providing unit operable to provide the image to which the received information relates to the address.

According to this structure, an image relating to position information can be specified and provided to an address. As a result, it is possible to provide an image exhibiting a distinctive feature of a position to an address, without requiring a mobile terminal to hold the image. Furthermore, an image can be selected on the mobile terminal side, and an image favored by the mobile terminal user provided to an address. Moreover, specification of an image is conducted by, for example, reading a stored image, newly creating an image, working on an existing image, or the like. Also, the provision of an image to an address refers not only to transmitting an image to an address, but also to enabling a person or entity at an address to acquire the image, such as, for example, enabling access via the Internet or the like to an image stored on a specific storage medium.

Here, the position information may show a position of the mobile terminal. According to this structure, an image relating to the position of a mobile terminal can be specified.

Furthermore, the position-information acquiring unit may acquire, from the mobile terminal, position information obtained by a global positioning system. According to this structure, the position-information acquiring unit is able to easily obtain data relating to position information.

Moreover, the image specifying unit may have a storage subunit that prestores images in correspondence with positional areas that each show a predetermined range, and the specified image may be an image corresponding to a positional area that includes the locality to which the position information relates. According to this structure, it is possible to promptly specify an image corresponding to a positional area.

Furthermore, the image providing unit may transmit the image to the address. According to this structure, an image from a mobile terminal can be reliably provided to an address.

Moreover, the image provision device may include a mail receiving unit operable to receive an electronic mail transmitted from the mobile terminal, and the image providing unit may attach the specified image to the received electronic mail and distribute the image-attached electronic mail to the address. By using mail in this way, images and various kinds of information can be easily transmitted/received. Here, "distribution" is a superordinate concept that includes the relaying of mail to a relay device such as another mail server or the like, and also the delivering of mail from an image provision device to an address.

On the other hand, an image provision system of the present invention that achieves the above object includes a mobile terminal and an image provision device, the mobile terminal having a first transmitting unit operable to transmit an address to which an image is to be provided, and the image provision device having: a reception unit operable to receive the address transmitted from the mobile terminal; a position-information acquiring unit operable to acquire position information relating to a locality; an image specifying unit operable to specify, based on the position information, a plurality of images relating to the position information; and a transmitting unit operable to transmit information relating to the specified plurality of images to the mobile terminal. The mobile terminal further has: a receiving unit operable to receive the information relating to the plurality of images from the image provision device; a reception unit operable to receive from a user, information relating to one of the images selected by the user from the information received by the receiving unit; and a second transmitting unit operable to transmit the information received from the user to the image provision device, and the image provision device further has: a receiving unit operable to receive the information transmitted from the mobile terminal; and an image providing unit operable to provide the image to which the received information relates to the address. According to this structure, an image relating to position information can be specified and provided to an address. Moreover, an image can be selected on the mobile terminal side, and an image favored by the mobile terminal user provided to an address.

Here, the position information may show a position of the mobile terminal, and the mobile terminal may have: a position-information acquiring unit operable to acquire the position from a global positioning system; and a third transmitting unit operable to transmit the position information to the image provision device. According to this structure, the position of a mobile terminal can be easily obtained from a global positioning system.

BRIEF DESCRIPTION OF THE DRAWINGS

FIG. 5 shows a mapping table in the embodiment;

FIG. 7 shows a format of a reply mail in the embodiment;

BEST MODE FOR CARRYING OUT THE INVENTION

An image provision system pertaining to an embodiment of the present invention is described below with reference to the drawings.

(1) Overall Structure of Image Provision System

Figure 1:
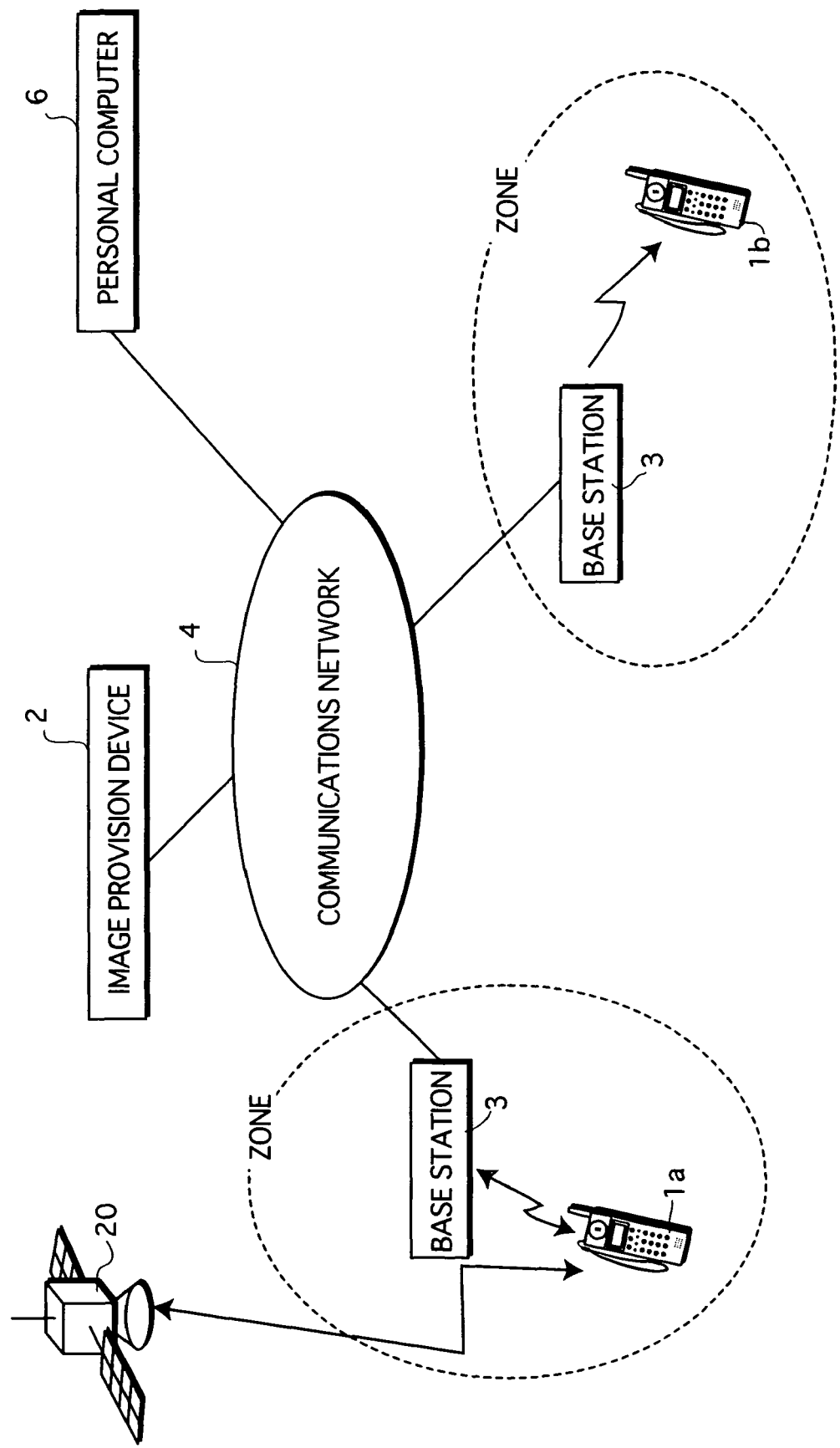
FIG. 1 is schematic diagram showing an overall structure that includes an image provision system in an embodiment of the present invention.

FIG. 1 is a schematic diagram showing an overall structure that includes the image provision system. The image provision system includes a mobile telephone 1a that transmits a mail, and an image provision device 2 that receives the transmitted mail, via a base station 3 in a zone in which mobile telephone 1a is located and a communications network 4.

Image provision device 2 is for acquiring from a received mail, position information showing a position of mobile telephone 1a, and for transmitting to a mobile telephone 1b, a mail storing an image specified based on the acquired position information (hereinafter, simply "image mail"). Because of this, image provision device 2 is provided in a transmission server or the like, for example, that reliably relays mail transmitted from mobile telephone 1a.

Figure 2:
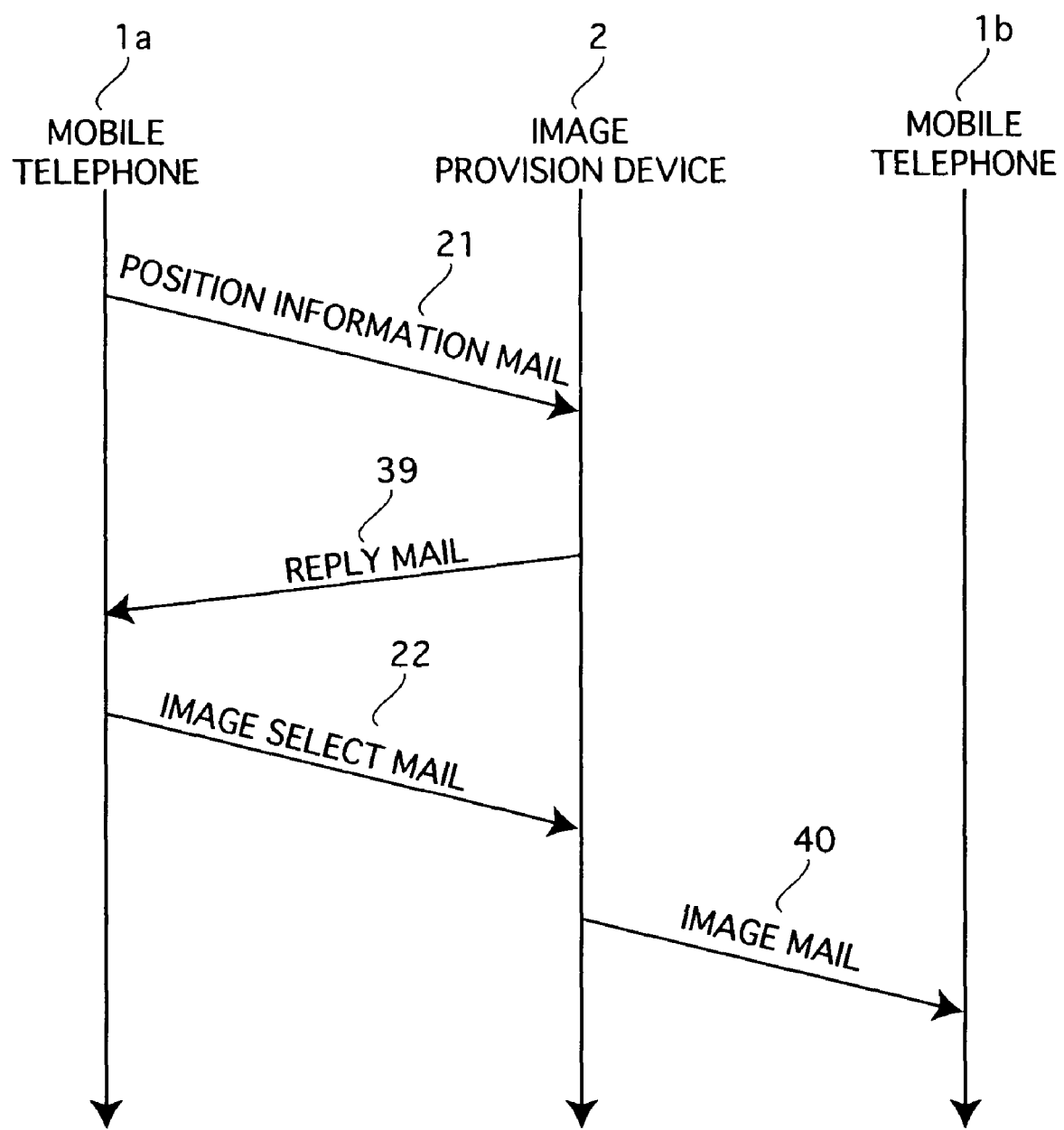
FIG. 2 shows a sequence between mobile telephones and an image provision device in the embodiment.

FIG. 2 shows a sequence between mobile telephone 1a and image provision device 2 when an image mail is created. The sequence between mobile telephone 1a and image provision device 2 will now be described broadly using FIG. 2. First, mobile telephone 1a transmits a mail 21 storing position information of mobile telephone 1a (hereinafter, simply "position information mail") to image provision device 2.

Image provision device 2, having received this mail, reads a plurality of images corresponding to the position information from an image storage unit, and creates so-called thumbnail images, which are reduced versions of the read images. The images and the thumbnail images are corresponded to each other by image IDs, and image provision device 2 transmits a mail 39 storing the thumbnail images and the image IDs (hereinafter, simply "reply mail") to mobile telephone 1a.

Mobile telephone 1a receives an operation from a user selecting one thumbnail image from the plurality of received thumbnail images. Then, mobile telephone 1a transmits a mail 22 storing the image ID of the selected thumbnail image (hereinafter, simply "image select mail") to image provision device 2. On receipt of this mail, image provision device 2 transmits a mail 40 storing an image corresponding to the image ID to mobile telephone 1b.

Here, an image corresponding to a position is an image of a tourist spot, a scenic spot, a building, a theme park, a local product, a person or the like, that is prestored in correspondence with the position, and has some sort of relationship with that position (locality). Moreover, image provision device 2 is also connected to a reception server via the Internet, and is able to acquire image mail 40 from personal computers 6.

(2) Mobile Telephone Structure

Figure 3:
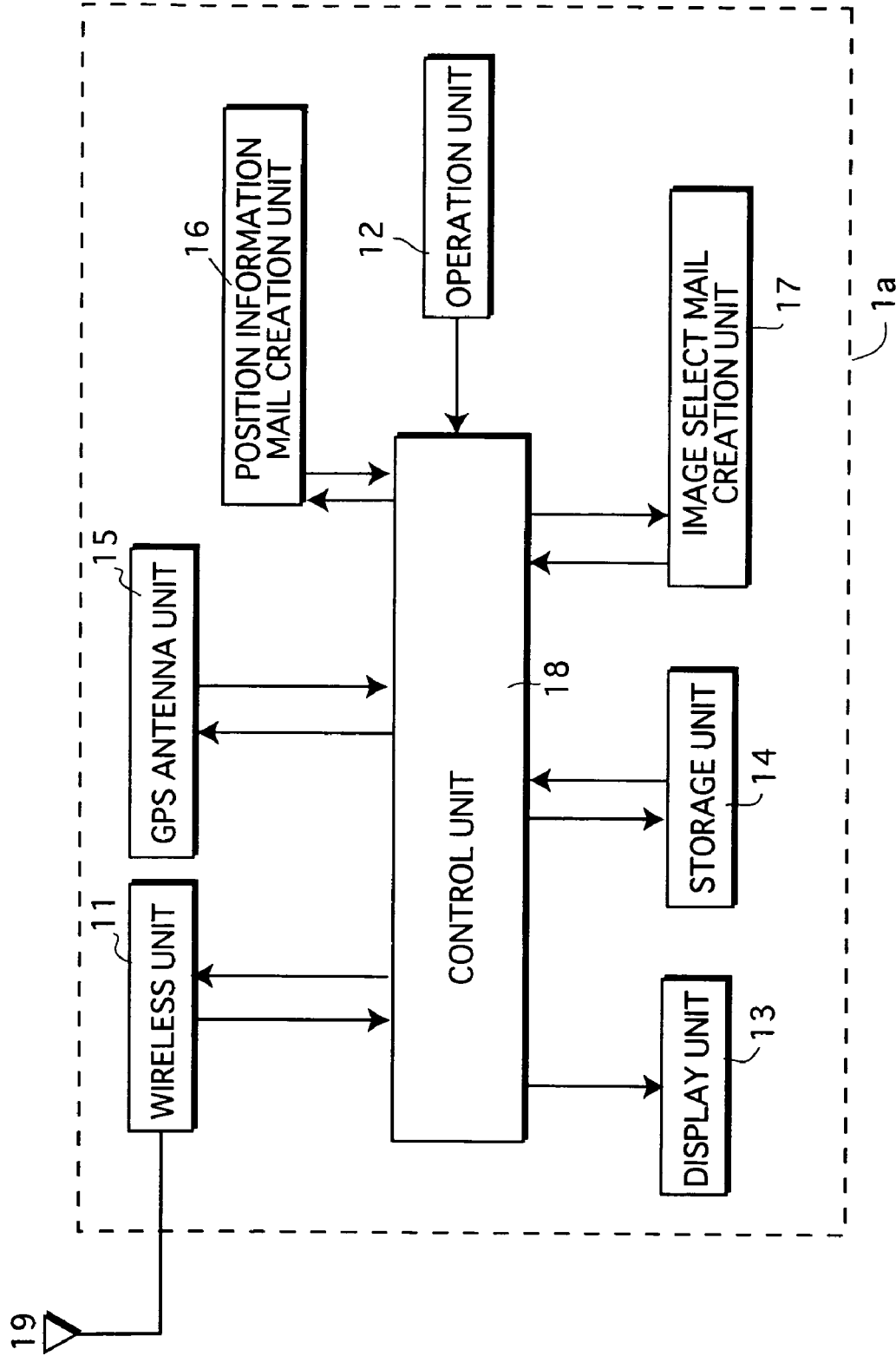
FIG. 3 is a block diagram shows a structure of a mobile telephone in the embodiment.

FIG. 3 is a block diagram showing a structure of mobile telephone 1a. Mobile telephone 1a has a telephone function and a mail function the same as the prior art. Description here relates mainly to the structure pertaining to image mail 40.

Mobile telephone 1a, as shown in FIG. 3, includes a wireless unit 11, an operation unit 12, a display unit 13, a storage unit 14, a GPS antenna unit 15, a position-information-mail creation unit 16, an image-select-mail creation unit 17, and a control unit 18.

Wireless unit 11 transmits/receives call signals, ring signals and the like, in addition to transmitting/receiving reply mail 39 and other mail via an antenna 19. Display unit 13 includes, for example, a liquid crystal display unit, and displays guidance for guiding user operations when various functions are executed, in addition to displaying received thumbnail images, mail content, messages under construction, and the like.

Operation unit 12 is where a user conducts various input operations relating to image mail 40, with respect to mobile telephone 1a. In order to conduct these input operations, operation unit 12 includes, in addition to a YES key signifying a "YES" input and a NO key signifying a "NO" input in accordance with guidance, for example, operation keys such as numeric keys for numeric inputs, a scroll key for scrolling the display content of display unit 13 up/down, function keys for selecting/executing/canceling the various functions, and so forth.

Here, input operations conducted by the user are operations indicating mail creation and the like, and specifically include an operation depressing the YES key or the NO key in accordance with guidance on display unit 13, an operation depressing the scroll key to scroll thumbnail images on display unit 13, and so forth.

Storage unit 14 is constituted by a RAM and the like, and besides storing various kinds of mail such as reply mail 39 and so forth, stores names of addresses, telephone numbers, mail addresses and so forth. GPS antenna unit 15 acquires the position information of mobile telephone 1a, and specifically, as shown in FIG. 1, acquires the latitude and longitude of the position of mobile telephone 1a from a global positioning system (GPS) that uses a satellite 20.

Position-information-mail creation unit 16 creates position information mail 21 (see FIG. 6) for transmitting the position information of mobile telephone 1a to image provision device 2. In position information mail 21, position information acquired by GPS antenna unit 15 is attached to a mail body. Position information mail 21 is described later.

Image-select-mail creation unit 17 creates image select mail 22 (see FIG. 8) for transmitting the result of one thumbnail image from out of the plurality of thumbnail images transmitted from image provision device 2 being selected by the user. Image select mail 22 is described later.

Here, the result of a user selection is an image ID corresponding to a thumbnail image selected by a user depressing an operation key, and is attached to a mail body. Moreover, in image select mail 22, as described later, is stored incorporation information instructing image provision device 2 whether or not to incorporate a message of text or the like in an image in image mail 40.

Control unit 18, on receipt from the user of an operation to create image mail 40, has GPS antenna unit 15 acquire position information and instructs position-information-mail creation unit 16 to create position information mail 21, and on receipt from the user of an operation selecting one out of the thumbnail images received from image provision device 2, instructs image-select-mail creation unit 17 to create image select mail 22.

Control unit 18 is structured from a microcomputer, and apart from conducting the above controls, conducts telephoning controls and mail transmission/reception controls in the same way as conventional mobile telephone 1*a*, as a result of the microprocessor executing a program stored in an internal ROM.

(3) Image Provision Device Structure

Figure 4:
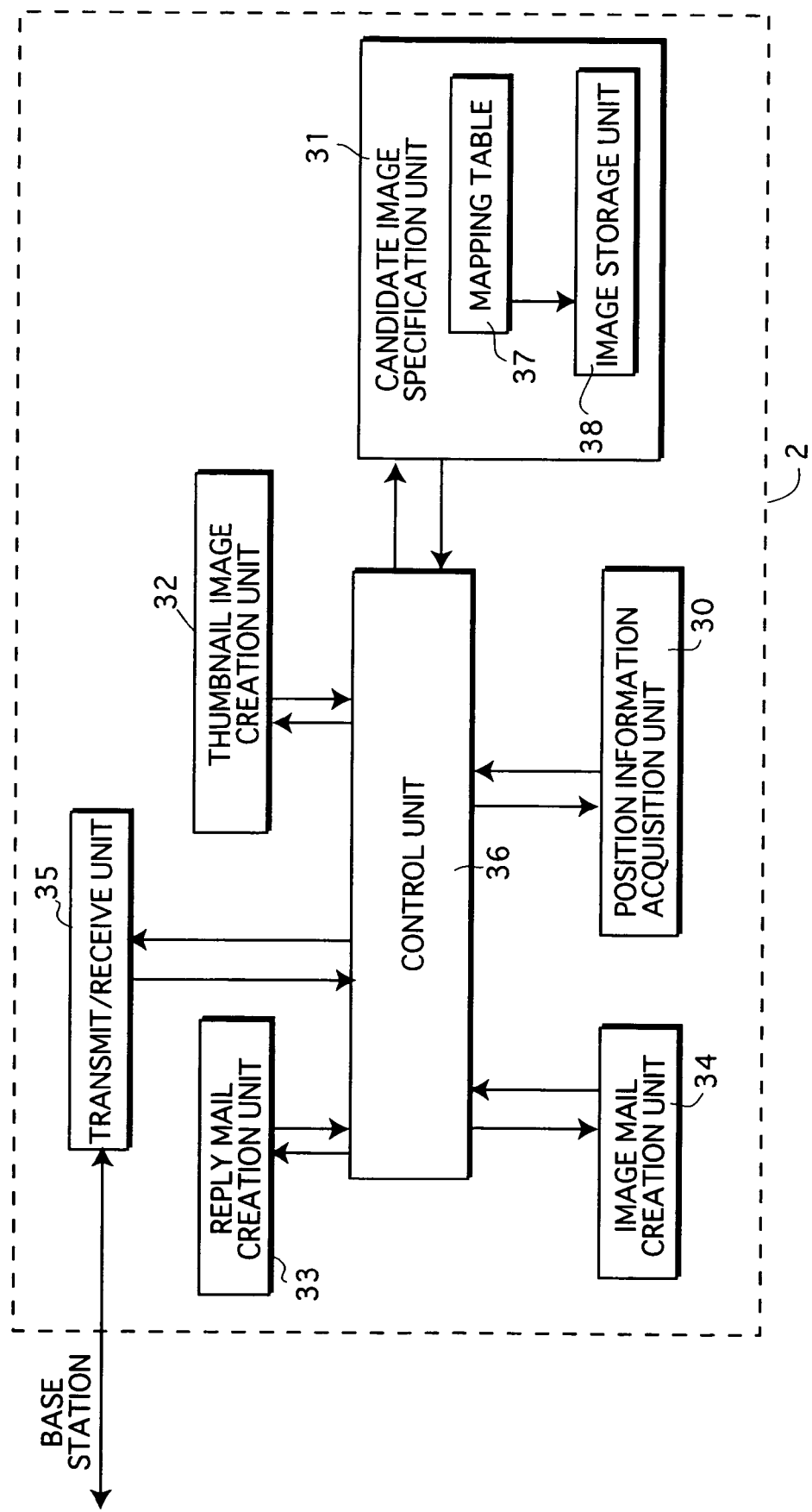
FIG. 4 shows a structure of an image provision device in the embodiment.

FIG. 4 is a block diagram showing a structure of image provision device 2. Image provision device 2 includes a position-information acquisition unit 30, a candidate-image specification unit 31, a thumbnail-image creation unit 32, a reply-mail creation unit 33, an image-mail creation unit 34, a transmit/receive unit 35, and a control unit 36.

Position-information acquisition unit 30 is for acquiring position information stored in position information mail 21. Candidate-image specification unit 31 is for specifying images corresponding to position information acquired by position-information acquisition unit 30. Specifically, unit 31 includes an image storage unit 38 storing images, and uses a mapping table 37 to correspond image IDs of the images with positional areas that show a geographical range. When images are to be specified, unit 31 specifies a positional area that includes the position in the position information, and images corresponding to the specified positional area are read from image storage unit 38 in accordance with image IDs in mapping table 37.

Image storage unit 38 is constituted by a ROM, a hard disk and the like. Images specified by candidate-image specification unit 31 are candidates of an image to be used in image mail 40, and are referred to below as "candidate images".

FIG. 5 shows mapping table 37. Each positional area corresponds to data (latitude, longitude) obtained from a global positioning system, and is a roughly square range in which the two respective diagonals are, for example, "36° ΔΔ'N, 138° ○Δ'E" and "36°×Δ'N, 138°×○'E" (here, "°" signifies degrees, and "'" signifies minutes). An image ID is an identification number showing an image stored in image storage unit 38, and for illustrative purposes is, for example, shown by "snowman.ID". Also, image IDs and image addresses are corresponded, so as to allow images to be read from image storage unit 38 based on the image IDs.

Thumbnail-image creation unit 32 is for creating thumbnail images, which are reduced versions of the plurality of candidate images specified by candidate-image specification unit 31. Reply-mail creation unit 33 is for creating reply mail 39 (see FIG. 7), in which thumbnail images and their image IDs are attached to a mail body. Reply mail 39 is described later.

Image-mail creation unit 34 is for creating image mail 40 (see FIG. 9A & 9B), and acquires an image ID from image select mail 22 when mail 22 is received, reads an image corresponding to the image ID (hereinafter, "use-image"), and stores the read image in the mail body. Image mail 40 is described later.

Image-mail creation unit 34 incorporates a message in a use-image when incorporation information in image select mail 22 is "1", for example, and does not incorporate a message in a use-image when the incorporation information is "0". The incorporation of a message in a use-image refers to extending an image to provide an incorporation area, outside of the image area of a use-image, for incorporating a message. Images that incorporate messages are still referred to as use-images (see FIG. 10A).

Transmit/receive unit 35, apart from returning reply mail 39 to mobile telephone 1*a*, which transmitted position information mail 21, receives image select mail 22 from mobile telephone 1*a*, and transmits image mail 40 to mobile telephone 1*b* and the like at the reception end.

Control unit 36, on receipt of position information mail 21, has position-information acquisition unit 30 acquire position information, has candidate-image specification unit 31 specify candidate images corresponding to the position information, has thumbnail-image creation unit 32 create thumbnail images of the candidate images, and instructs reply-mail creation unit 33 to create reply mail 39, and on receipt of image select mail 22, instructs image-mail creation unit 34 to create image mail 40. Control unit 36 is structured from a microcomputer, and conducts the various controls such as the above instruction by the microcomputer executing a program stored in an internal ROM.

Figure 6:
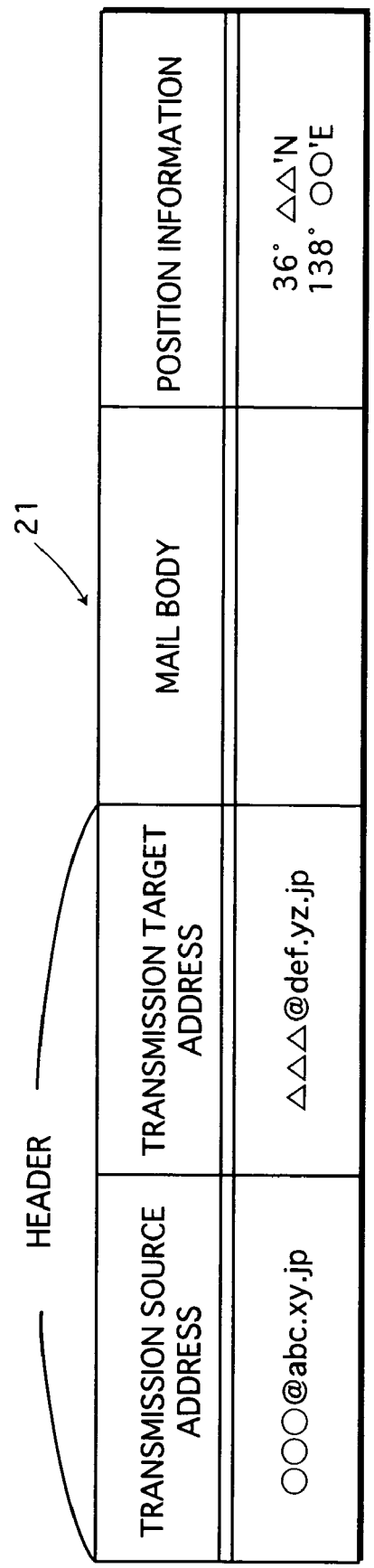
FIG. 6 shows a format of a position information mail in the embodiment.

(4) Data Structure of Mail Transmitted from Mobile Telephone/Image Provision Device FIG. 6 shows a data structure of position information mail 21 transmitted from mobile telephone 1*a* to image provision device 2, and an exemplary content of mail 21. Position information mail 21, as shown in FIG. 6, stores a transmission source address and a transmission target address in a header of a mail, a mail body, and position information.

The transmission source address is one's own (i.e. mobile telephone 1*a*) mail address, and the transmission target address is the mail address of the transmission target (e.g. mobile telephone 1*b*) of image mail 40. Position information is data acquired by GPS antenna unit 15, and is formed from a latitude and a longitude. Here, position information is attached to a mail body using, for example, a MIME (Multipurpose Internet Mail Extensions) format.

FIG. 7 shows a data structure of reply mail 39 transmitted by image provision device 2, and an exemplary content of mail 39. Reply mail 39, as shown in FIG. 7, is formed from a transmission source address, a transmission target address, and a mail body. A plurality (i.e. 3) of thumbnail images and their image IDs are attached to the mail body using the MIME format.

The transmission target address is the mail address of mobile telephone 1*a*, and specifically is obtained by acquiring the transmission source address from position information mail 21. The transmission source address is the mail address of image provision device 2.

Thumbnail images are images created by thumbnail-image creation unit 32, and image IDs correspond these thumbnail images with images specified by candidate-image specification unit 31.

Figure 8:
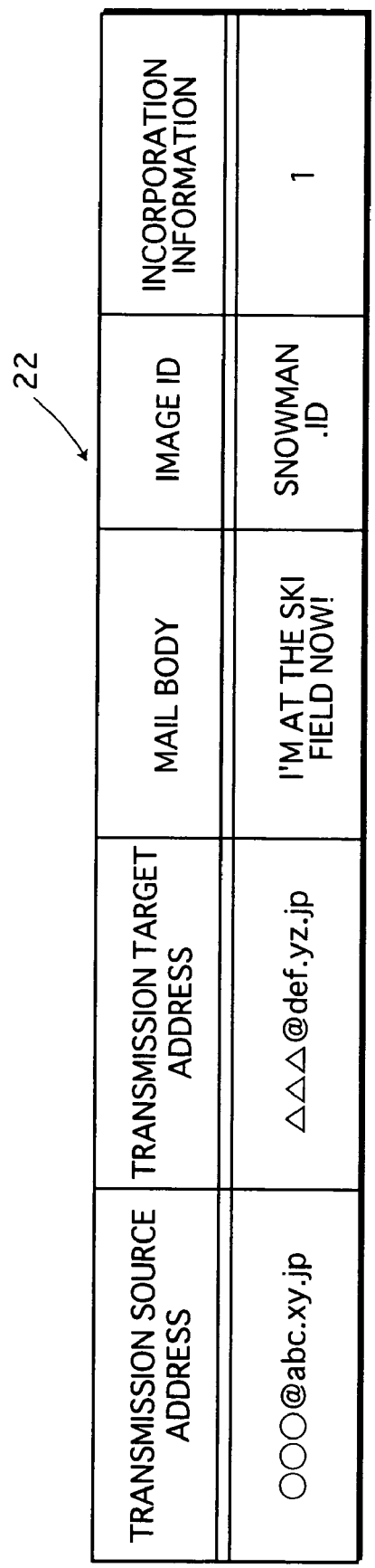
FIG. 8 shows a format of an image select mail in the embodiment.

FIG. 8 shows a data structure of image select mail 22 transmitted by mobile telephone 1a, and an exemplary content of mail 22. Image select mail 22 is formed from a transmission source address, a transmission target address, and a mail body. An image ID and incorporation information are attached to the mail body using the MIME format.

The transmission source address and the transmission target address are the same address as used in position information mail 21. The image ID corresponds to a thumbnail image selected by the user, and is, for example, "snowman. ID" when the selected thumbnail image is "snowman".

Incorporation information is for instructing whether or not image provision device 2 is to incorporate a message in the use-image. "1" for example shows that a message is to be incorporated in the use-image. The mail body is for storing a message when a message is to be incorporated in the use-image. "I'm at the ski field now!", for example, is stored. Here, the incorporation information is "0" when a message is not to be incorporated in the image.

(5) Image Mail and Related Data Structure

Figure 9A:
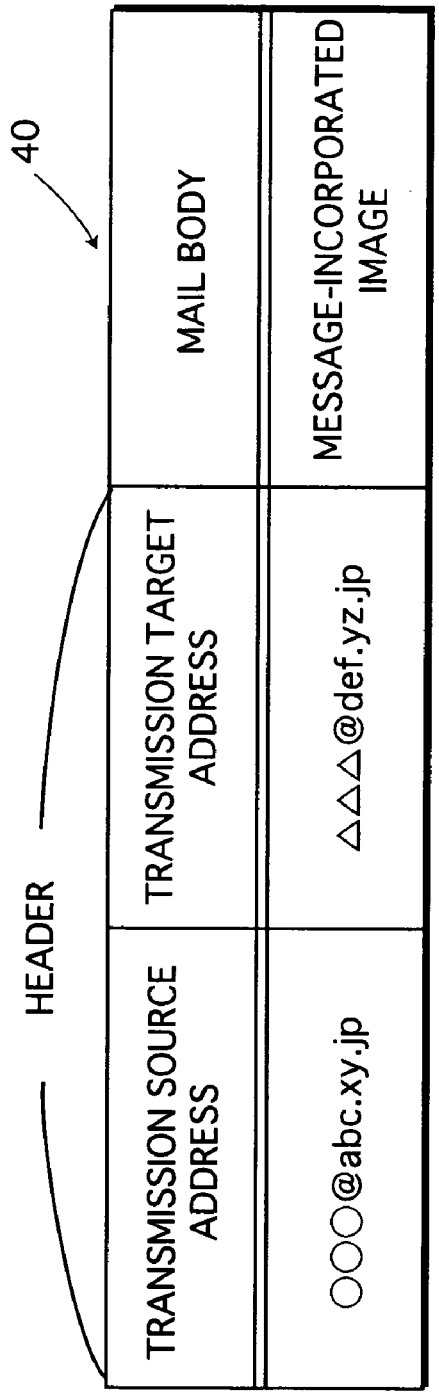
FIG. 9A shows a format of an image mail when a message is incorporated.
Figure 9B:
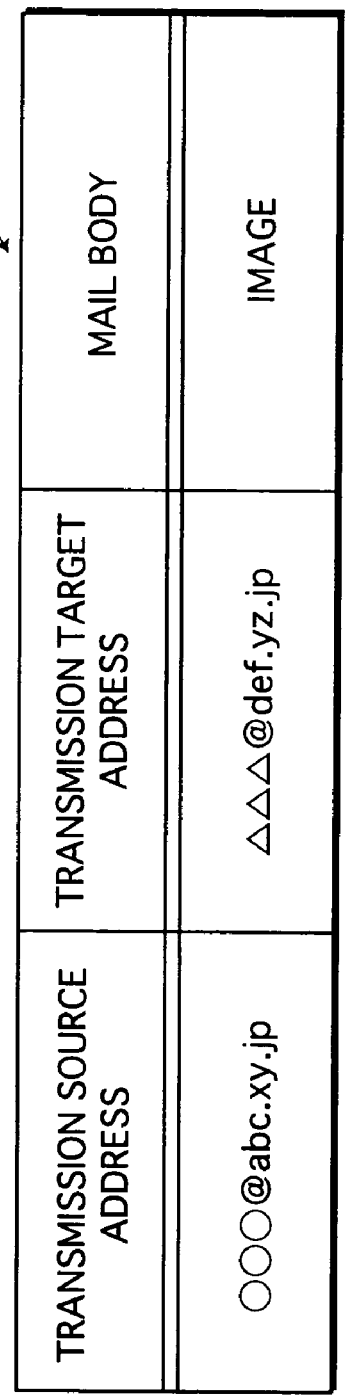
FIG. 9B shows a format of an image mail when a message is not incorporated.

FIGS. 9A and 9B show a data structure of image mail 40 and an exemplary content of mail 40. Image mail 40 is formed from a transmission source address, a transmission target address, and a mail body. An image is stored in the mail body. Here, FIG. 9A shows when the message, "I'm at the ski field now!", is incorporated in the image, and FIG. 9B shows when a message is not incorporated.

Figure 10A:
FIG. 10A shows an image mail when a message is incorporated.
Figure 10B:
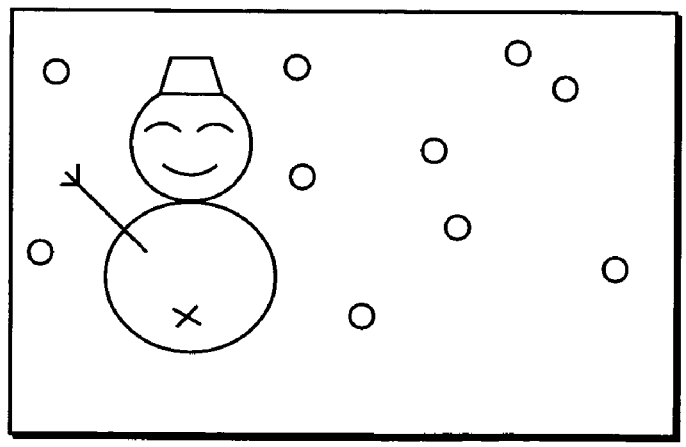
FIG. 10B shows an image mail when a message is not incorporated.

FIGS. 10A and 10B show examples of image mail 40. The image in image mail 40 corresponds to the position of mobile telephone 1a, which transmitted position information mail 21, and is the equivalent of the picture or photograph part of a postcard. There is a ski field in the positional area that includes the position of mobile telephone 1a, a snowman being used as the corresponding image in FIGS. 10A and 10B. Here, FIG. 10A is the image mail corresponding to FIG. 9A, and FIG. 10B is the image mail corresponding to FIG. 9B.

(6) Mail Creation Processing in Mobile Telephone

Figure 11:
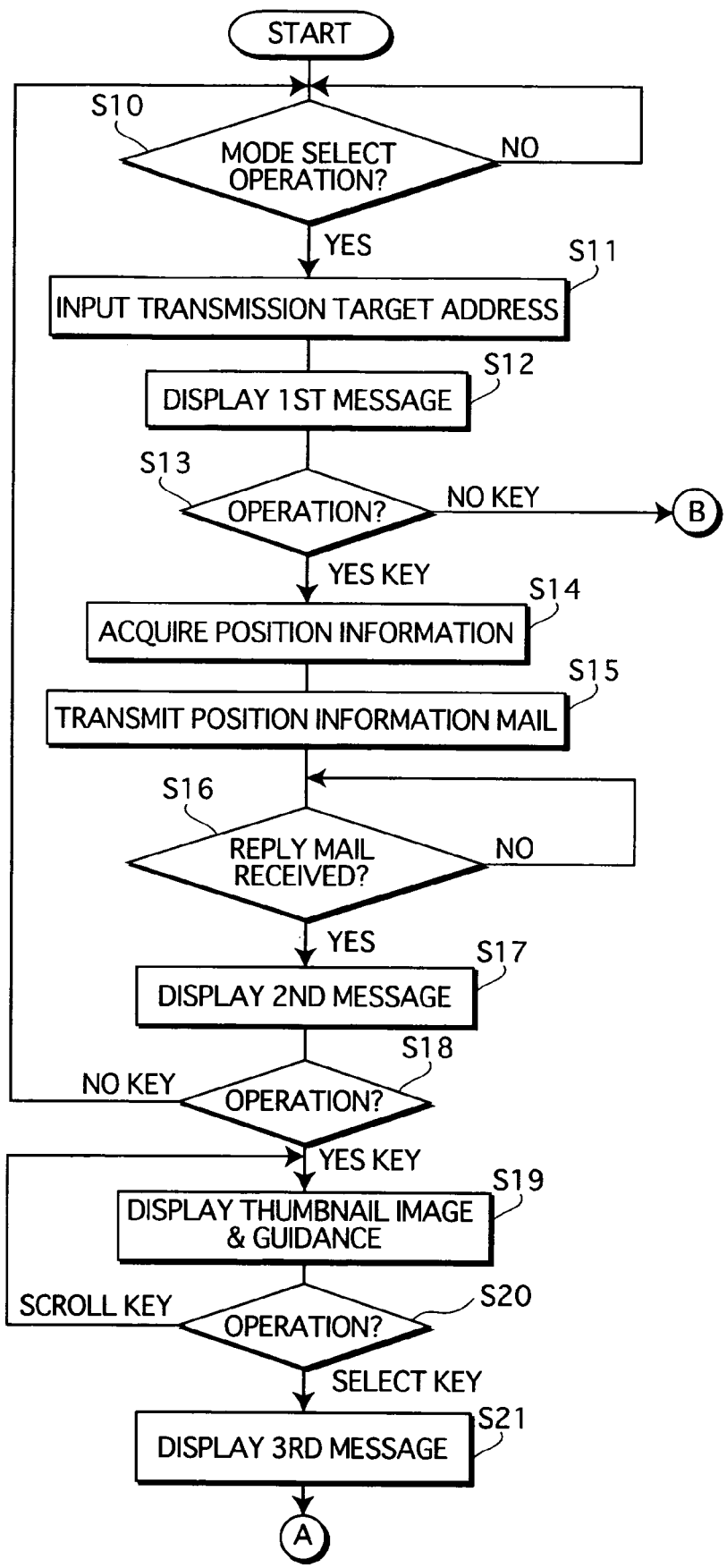
FIG. 11 is a flowchart of mobile telephone mail creation in the embodiment.
Figure 12:
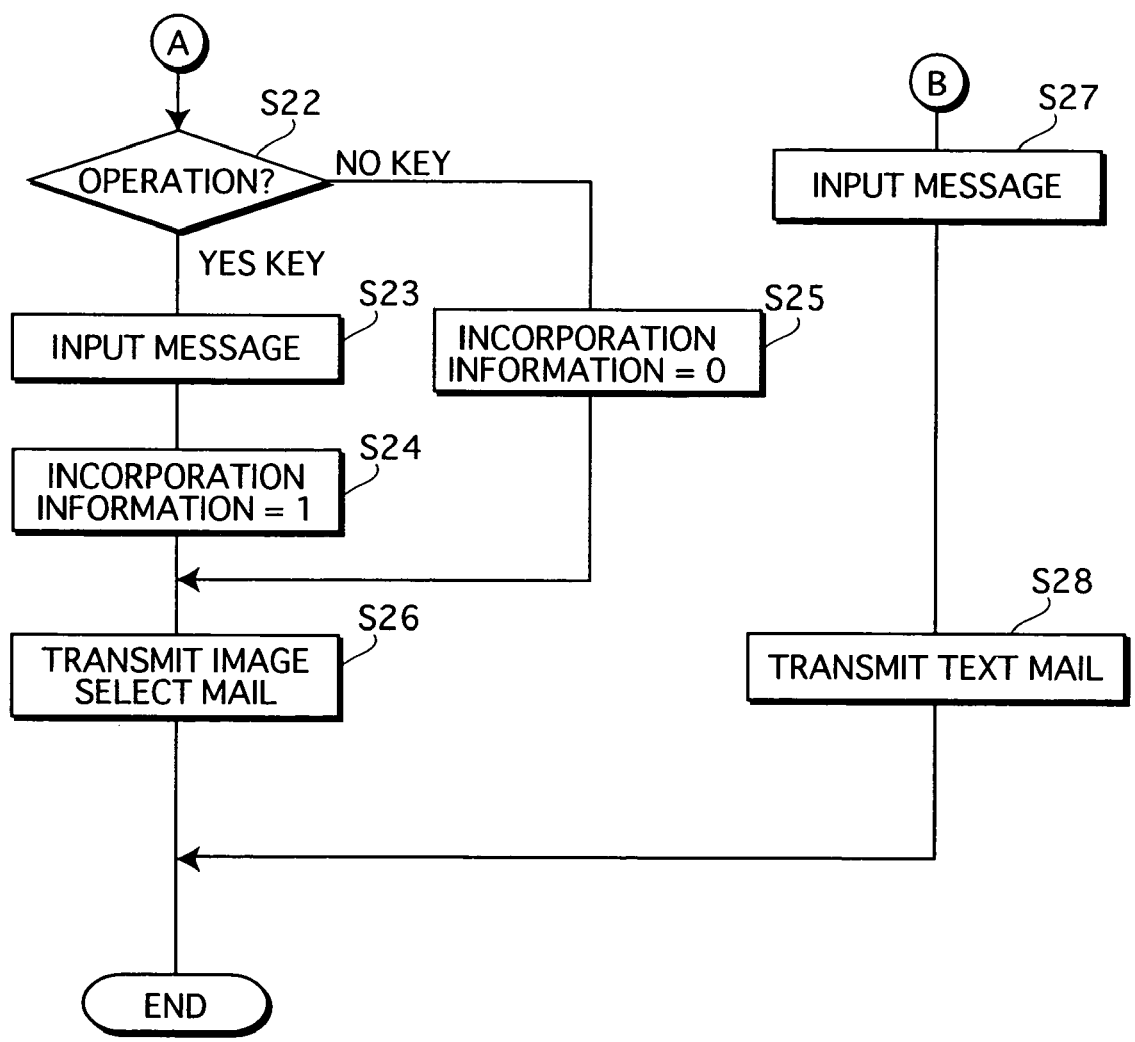
FIG. 12 is a flowchart of mobile telephone mail creation in the embodiment.

FIG. 11 and FIG. 12 are flowcharts of mail creation in control unit 18 of mobile telephone 1a. The creation of image mail 40 in FIG. 10A is described below as an example.

Control unit 18, when there is a user operation selecting a mail creation mode, receives input of an address for transmitting a mail to, namely, transmission target address "ΔΔΔ@def.yz.jp" (Step S10=YES; S11).

Specifically, the user conducts operations such as inputting from numeric keys and reading of a registered mail address from storage unit 14. Here, received transmission target address "ΔΔΔ@def.yz.jp" and one's own address (i.e. transmission source address) "○○○@abc.xy.jp" are, as shown in FIG. 6, stored in the mail header.

When inputting of the transmission target address is completed, control unit 18 displays a first message, for example, "create an image mail?", on display unit 13 (step S12). Then, when there is a user operation of the YES key showing the creation of image mail 40, control unit 18 instructs GPS antenna unit 15 to acquire present position information "36° ΔΔ'N, 138° ○○'E" from a global positioning system (step S13=YES; S14).

Next, control unit 18 instructs position-information-mail creation unit 16 to create position information mail 21. That is, position-information-mail creation unit 16 attaches the position information acquired by GPS antenna unit 15 to a mail body to create position information mail 21 (see FIG. 6). Control unit 18 transmits the created position information mail 21 to image provision device 2 from wireless unit 11 (step S15).

Reply mail 39 storing thumbnail images and related image IDs is returned from image provision device 2.

Control unit 18, on receipt of reply mail 39 from wireless unit 11, displays a second message, for example, "view thumbnail images?", on display unit 13 (step S16=YES; S17).

When there is a NO key operation indicating not to view the thumbnail images, control unit 18 returns to step S10. A NO key operation results, for example, from the user canceling image mail creation or realizing that the transmission target address is wrong.

Conversely, when there is a YES key operation indicating to view the thumbnail images, control unit 18 reads the head thumbnail image "snowman" attached to the mail body in the received reply mail 39, and displays the reads thumbnail image on display unit 13 together with guidance (step S18=YES; S19).

This guidance, for example, guides/advices the user to depress a select key when selecting a displayed thumbnail image, or to depress a scroll key when wanting to display a previous thumbnail image or a following thumbnail image.

When there is a user operation depressing a scroll key in accordance with the guidance (step S20=SCROLL KEY), control unit 18 returns to step S19 and displays the next thumbnail image "○×Park" in place of the currently displayed thumbnail image "snowman". Here, the sequence of the thumbnail images for display is, for example, the order in which the images are attached to reply mail 39.

On the other hand, when there is a user operation depressing the select key in accordance with the guidance (step S20=SELECT KEY), control unit 18 instructs image-select-mail creation unit 17 to create image select mail 22. That is, image-select-mail creation unit 17 acquires image ID "snowman.ID" of the thumbnail image "snowman" selected by the user, and attaches the image ID to the mail body. At this time, the transmission target address received at step S11 and the transmission source address are stored in the mail header.

Next, control unit 18 displays a third message, for example, "incorporate a message in the image?" on display unit 13 (step S21). Then, when there is a YES key operation in the case of incorporating a message, control unit 18 receives a message "I'm at the ski field now!" from the user, and sets the incorporation information to "1" (step S22=YES; S23; S24). The incorporation information is attached to the mail body, in addition to the received message being stored in the mail body by image-select-mail creation unit 17.

On the other hand, when there is a NO key operation at step S22 in the case of not incorporating a message, image-select-mail creation unit 17 sets the incorporation information to "0" and attaches it to the mail body (step S25).

Control unit 18 transmits image select mail 22 having incorporation information attached thereto to image provision device 2 from wireless unit 11 via the closest base station 3 (step S26).

Moreover, when there is a NO key operation at step S13 in the case of not creating image mail 40 (i.e. the mail does not include an image; hereinafter "text mail"), control unit 18 receives input of a message for use in the text mail from the user (step S13=NO; S27). Then, control unit 18 stores the received message in the mail body and transmits the text mail to image provision device 2 from wireless unit 11 (step S28).

(7) Image Provision Processing in Image Provision Device

Figure 13:
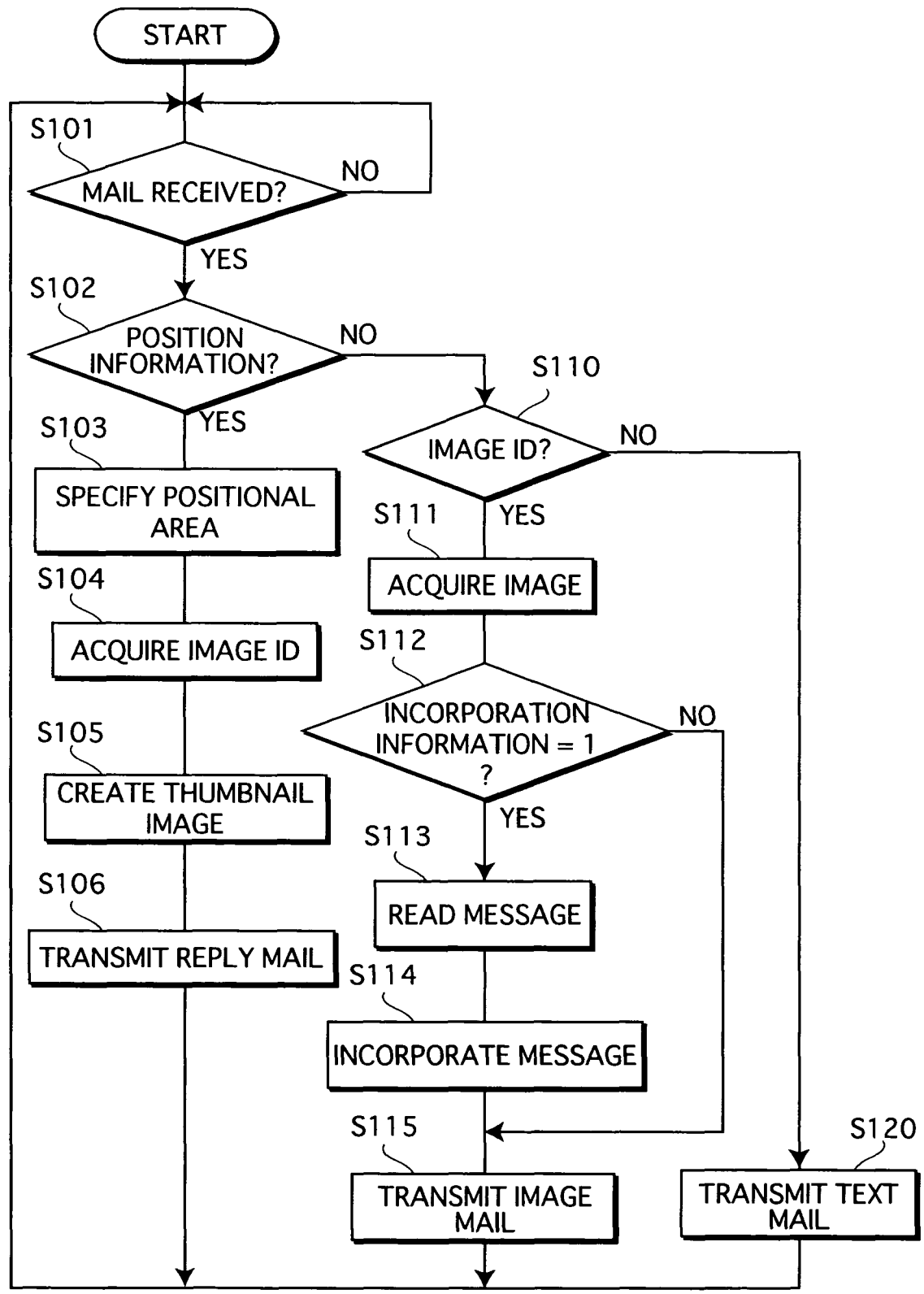
FIG. 13 is a flowchart of controls performed by a control unit of the image provision device in the embodiment.

FIG. 13 is a flowchart of the processing conducted by control unit 36 of image provision device 2. As shown in FIG. 13, control unit 36, on receipt by transmit/receive unit 35 of a mail, judges whether position information is attached to the mail body (step S101=YES; S102).

When position information is attached to the mail body (i.e. when the mail is position information mail 21), control unit 36 instructs position-information acquisition unit 30 to acquire the position information "36° ΔΔ'N, 138° ∘∘'E" (step S102=YES).

Then, control unit 36 instructs candidate-image specification unit 31 to specify candidate images corresponding to the acquired position information. That is, candidate-image specification unit 31 specifies a positional area that includes the position in the position information (step S103).

Next, candidate-image specification unit 31 acquires image IDs "snowman.ID", "∘×park.ID" and "ΔΔartmuseum.ID" corresponding to the specified positional area "36° Δ∘'N, 138° ∘Δ'E-36°×Δ'N, 138°×∘'E" from mapping table 37 in FIG. 7 (step S104). Then, candidate-image specification unit 31 reads images corresponding to these image IDs from image storage unit 38 to specify the candidate images.

Next, control unit 36 instructs thumbnail-image creation unit 32 to create thumbnail images of the candidate images. That is, thumbnail-image creation unit 32 downscales each of the candidate images specified by candidate-image specification unit 31 to create thumbnail images "snowman", "∘×Park" and "ΔΔ Art Museum" (step S105).

Then, control unit 36 instructs reply-mail creation unit 33 to create reply mail 39. That is, reply-mail creation unit 33, in addition to attaching the created thumbnail images and related image IDs to the mail body (see FIG. 7), acquires the transmission source address in position information mail 21, stores this address in the transmission target address, and stores the mail address "×××@ghi.xz.jp" of image provision device 2 in the transmission source address. Then, control unit 36 transmits this reply mail 39 from transmit/receive unit 35 to mobile telephone 1a, which was the transmission source of position information mail 21 (step S106).

On the other hand, when position information is not attached to the mail body of a mail received at step S102, control unit 36 judges whether an image ID is attached to the mail body (step S102=NO; S110). When an image ID is attached (i.e. when the mail is image select mail 22), control unit 36 instructs image-mail creation unit 34 to create image mail 40.

That is, image-mail creation unit 34 acquires the image ID "snowman.ID" from image select mail 22 (step S111), and reads the image "snowman" corresponding to the acquired image ID.

Next, image-mail creation unit 34 acquires the incorporation information from image select mail 22, and when the acquired incorporation information is "1", reads the message "I'm at the ski field now!" from the mail body, and incorporates this message in the use-image "snowman" (step S112=YES; S113; S114). On the other hand, when the acquired incorporation information is "0", image-mail creation unit 34 proceeds to step S115 (step S112=NO).

Then, image-mail creation unit 34, in addition to storing an image either having or not having a message incorporated in the mail body, stores the transmission source and target addresses of image select mail 22 in the mail header (see FIGS. 9A & 9B).

Control unit 36 transmits image mail 40 from transmit/receive unit 35 to mobile telephone 1b or the like having the transmission target address "ΔΔΔ@def.yz.jp" (step S115).

Moreover, when an image ID is not attached to the mail body at step S110 (i.e. the mail is a text mail), control unit 36 transmits the text mail from transmit/receive unit 35 to mobile telephone 1b or the like (step S110=NO; S120).

After reply mail 39 (step S106), image mail 40 (step S115), or the text mail (step S120) have been transmitted, control unit 36 returns to step S101.

As described above, because images are specified based on position information, stored in image mail 40, and provided to a transmission target according to the present embodiment, images exhibiting distinctive features of a position can be provided to the transmission target. In particular, because the position information shows the position of mobile telephone 1a, it is possible to have the images exhibit distinctive features of the position in which mobile telephone 1a is situated.

Supplement

While the present invention is described above based on the embodiment, the content of the present invention is, of course, not limited to the specific examples shown in the above embodiment, it being possible, for example, to implement the following variations.

Variation 1

Although in the above embodiment, position information shows the position of mobile telephone 1a, it may show a place other than the position of mobile telephone 1a. In this case, for example, a user may input position information other than the position of mobile telephone 1a and images corresponding to the inputted position information may be specified in image provision device 2. According to this structure, it is possible to provide images corresponding to a place removed from the position of mobile telephone 1a.

Variation 2

Although in the above embodiment, the position of mobile telephone 1a is acquired from a global positioning system, position information may be acquired from a source other than a global positioning system. For example, it is possible to specify the position of a base station 3 in the zone in which mobile telephone 1a, which transmitted position information mail 21, is situated as the position of mobile telephone 1a. In this case, the position information of the base station in the zone in which mobile telephone 1a is situated is appended to position information mail 21 transmitted from mobile telephone 1a, and candidate-image specification unit 31 in image provision device 2 may acquire the position information appended to the mail.

Variation 3

Although in the above embodiment, mobile telephone 1a is used as a mobile terminal, a personal digital assistant (PDA) may be used instead of mobile telephone 1a, and may transmit image mail 40. In this case, the PDA is, for example, connected to a telephone circuit via a PC card having a communications function, and may variously transmit/receive mails 21, 22 and 39.

Variation 4

Although in the above embodiment, as shown in FIG. 10A, a message is incorporated into an area outside of the image area so as to not overlap with the use-image, the message may be incorporated into the image area so as to overlap with the use-image. Furthermore, instead of a message, an image provided by a user may be transmitted to image provision device 2, and combined with a use-image showing a distinctive feature of a position. Also the place name or the like of the position information may be incorporated into a use-image. Furthermore, a message may be stored in the mail body without being incorporated in a use-image, and the use-image transmitted as an attachment file. Also, although in the above embodiment, the use-image is stored in the mail body, it may be attached to the mail body using the MIME format, for example.

Variation 5

Although in the above embodiment, a message to be incorporated in a use mail is transmitted using image select mail 22, it may be transmitted using position information mail 21, which is the mail initially transmitted from mobile telephone 1a to image provision device 2.

Variation 6

Although in the above embodiment, a plurality of candidate images is specified and the user selects one image, a plurality of images may be selected. In this case, the plurality of images may be, for example, above/below or to the left/right or one another, or combined so as to overlap with one another.

Variation 7

Although in the above embodiment, image mail 40 created by image-mail creation unit 34 in image provision device 2 is transmitted to the transmission target mobile telephone 1b, it may initially be transmitted to mobile telephone 1a for the user to affirm image mail 40.

Variation 8

Although in the above embodiment, a plurality of candidate images is specified and the user selects one image, there may be only one candidate image. In this case, the candidate image may be transmitted to mobile telephone 1a so that the user can affirm the image for use, or it may be provided to the address as image mail 40 without the user's affirmation.

Also, when there is one candidate image, position information attached to position information mail 21 may be replaced by the image and mail 21 then provided to the address.

Variation 9

Although in the above embodiment, mail (position information mail 21, image select mail 22, reply mail 39) is used in the exchange of information between mobile telephone 1a and image provision device 2, reception/transmission may be conducted in accordance with a protocol arranged independently between mobile telephone 1a and image provision device 2.

Variation 10

Although in the above embodiment, image provision device 2 is provided in a reception server, it may be provided in a transmission server. Furthermore, image provision device 2 may be made to hold mail addresses, the various mails 21, 22 and 39 may be transmitted/received between mobile telephone 1a and image provision device 2, and image mail 40 may be transmitted from image provision device 2 to the address of mobile telephone 1b.

In this case, the mail address of mobile telephone 1b may be stored in at least one of position information mail 21 and image select mail 22 transmitted from mobile telephone 1a. As a storage method, the mail address may be attached to a mail body using the MIME format. In this case, image provision device 2 may be a World Wide Web server.

Variation 11

Although in the above embodiment, thumbnail images are created as information relating to candidate images corresponding to position information, and transmitted to mobile telephone 1a, titles of the candidate images, for example, may be transmitted to mobile telephone 1a as information relating to the candidate images, or the candidate images themselves may be transmitted. Also, although thumbnail images are created by downscaling images specified by candidate-image specification unit 31, they may be created in advance to correspond to images stored by image storage unit 38.

Variation 12

Although in the above embodiment, mobile telephone 1a displays thumbnail images received from image provision device 2 on display unit 13 one image at a time, a plurality of thumbnail images may be displayed collectively on a single screen of display unit 13, and a user may select a desired thumbnail image from among these.

Variation 13

Although in the above embodiment, image provision device 2 reads images relating to position information from image storage unit 38, it may create images relating to position information. An example of this is a design of the position itself, based on the position information. Specifically, this may be an image or the like displaying the latitude and longitude of the position.

In this case, image provision device 2 is not required to include image storage unit 38, and mobile telephone 1a may transmit a mail storing position information, incorporation information that instructs image provision device 2 whether or not to incorporate a message in an image, and, when a message is to be incorporated, the message.

INDUSTRIAL APPLICABILITY

An image provision device and an image provision system that pertain to the present invention can be used in providing images that exhibit distinctive features of a position to a transmission target.

The invention claimed is:

1. An image provision device for providing an image to a person different from a user of a mobile terminal, comprising:
    a storage unit that stores a plurality of images relating to two or more of a plurality of localities and each locality corresponding to a piece of image information that is available for transmission to the mobile terminal;
    a mapping table that corresponds each of the plurality of images with a range of latitude and longitude coordinates, each range of latitude and longitude coordinates corresponding to a different locality;
    a position-information acquiring unit that acquires position information indicating a range of latitude and longitude coordinates for a locality of the mobile terminal;
    an image specifying unit that specifies all images corresponding to the range of latitude and longitude coordinates for the locality indicated by the position information, from among the plurality of images stored in the storage unit;
    an information transmitting unit that transmits to the mobile terminal pieces of image information corresponding to the specified images, the transmitted pieces of image information to be used as candidate images from which the user selects an image to be provided to the person different from the user of the mobile terminal;
    a reception unit that receives a piece of image information selected, by the user of the mobile terminal, among the transmitted one or more pieces of image information; and
    a providing unit that provides the person different from the user of the mobile terminal an image corresponding to the piece of image information received by the reception unit, by making the corresponding image accessible to the person different from the user of the mobile terminal.

2. The image provision device of claim 1, wherein the position-information acquiring unit acquires the position information from a global positioning system.

3. The image provision device of claim 1, wherein
the storing unit stores the plurality of images in correspondence with positional areas that each show a predetermined range including a related one of the plurality of localities, and
each specified image is an image corresponding to a positional area that includes the locality to which the position information relates.

4. The image provision device of claim 1, further comprising:
a message acquiring unit that acquires a message;
an incorporating unit that incorporates the acquired message in an image corresponding to the piece of information received by the receiving unit; and
the providing unit provides the message-incorporated image to the person different from the user of the mobile terminal.

5. The image provision device of claim 1, wherein
the providing unit attaches the image to an electronic mail to obtain an image-attached electronic mail, and provides the image-attached electronic mail to the person different from the user of the mobile terminal.

6. The image provision device of claim 1, wherein
the pieces of image information corresponding to the specified images are thumbnail images of the specified images.

7. The image provision device of claim 1, wherein
the pieces of image information corresponding to the specified images are information representing the specified image without use of the images.

8. A mobile terminal comprising:
an image information receiving unit that receives, from an image provision device, one or more pieces of image information, based on a position information indicating a locality of the mobile terminal, each corresponding to an image that relates to a range of latitude and longitude coordinates, the received pieces of images information to be used as candidate images from which a user selects an image to be provided to a person different from a user of the mobile terminal;
a reception unit that receives a piece of image information selected, by the user, among the one or more pieces of image information that correspond to the range of latitude and longitude coordinates;
a transmitting unit that transmits the received piece of image information to the image provision device; and
a receiving unit that receives a selected image that corresponds to the transmitted piece of image information and relates to the range of latitude and longitude coordinates.

9. The mobile terminal of claim 8, wherein
the pieces of image information relating to the specified images are thumbnail images of the specified images.

10. An image provision device for providing an image to a person different from a user of a mobile terminal comprising:
a storage unit that stores a plurality of images, each of the images relating to a range of latitude and longitude coordinates, each range of latitude and longitude coordinates corresponding to a different locality;
a position-information acquiring unit that acquires position information indicating a range of latitude and longitude coordinates for a locality of the mobile terminal;
an image specifying unit that specifies all images corresponding to the range of latitude and longitude coordinates for the locality indicated by the position information, from among the plurality of images stored in the storage unit;
an information transmitting unit that transmits, to the mobile terminal, pieces of image information corresponding to the specified images, the transmitted pieces of information to be used as candidate images from which the user selects an image to be provided to the person different from the user of the mobile terminal;
a reception unit that receives a piece of image information selected, by the user of the mobile terminal, among the transmitted one or more pieces of image information; and
a providing unit that provides to the person different from the user of the mobile terminal an image corresponding to the piece of image information received by the reception unit, by making the corresponding image accessible to the person different from the user of the mobile terminal.

11. The image provision device of claim 10, wherein the position-information acquiring unit acquires the position information from a global positioning system.

12. The image provision device of claim 10, wherein
the storage unit stores the plurality of images in correspondence with positional areas that each show a predetermined range including a related one of the plurality of localities, and
each specified image is an image corresponding to a positional area that includes the locality to which the position information relates.

13. The image provision device of claim 12, further comprising:
a message acquiring unit that acquires a message;
an incorporating unit that incorporates the acquired message with an image corresponding to the piece of information received by the receiving unit; and
the providing unit provides the message-incorporated image to the person different from the user of the mobile terminal.

14. The image provision device of claim 13, wherein
the providing unit attaches the image to an electronic mail to obtain an image-attached electronic mail, and provides the image-attached electronic mail to the person different from the user of the mobile terminal.

15. The image provision device of claim 14, wherein
the pieces of image information corresponding to the specified images are thumbnail images of the specified images.

16. The image provision device of claim 14, wherein
the pieces of image information corresponding to the specified images are information representing the specified image without use of the images.

17. The image provision device of claim 1, wherein
the reception unit receives two or more pieces of image information selected, by a user of the mobile terminal, among the transmitted pieces of image information; and
the providing unit provides to the person different from the user of the mobile terminal the two or more images corresponding to the two or more image information received by the reception unit.

18. The image provision device of claim 4, wherein
the incorporating unit incorporates the acquired message in the image corresponding to the piece of information received by the receiving unit by extending the image to include an incorporation area and incorporating the acquired message in the incorporation area.

19. The image provision device of claim 6 further comprising a thumbnail creating unit creating thumbnail images of the specified images.

20. The mobile terminal of claim 8 further including means for selecting the image that relates to the specific position and storing the image at an image provision device remote from the mobile terminal for viewing on a second mobile terminal.

21. An image provision device for providing an image to a person different from a user of a mobile terminal, comprising:

a storage unit that stores a plurality of images relating to two or more of a plurality of localities and each locality corresponding to a piece of image information that is available for transmission to the mobile terminal;

a position-information acquiring unit that acquires position information indicating a locality of the mobile terminal;

an image specifying unit that specifies all images relating to the locality indicated by the position information, from among the plurality of images stored in the storage unit;

an information transmitting unit that transmits to the mobile terminal pieces of image information corresponding to the specified images, the transmitted pieces of image information to be used as candidate images from which the user selects an image to be provided to the person different from the user of the mobile terminal;

a reception unit that receives a piece of image information selected, by the user of the mobile terminal, among the transmitted one or more pieces of image information; and a providing unit that provides the person different from the user of the mobile terminal an image corresponding to the piece of image information received by the reception unit, by storing the corresponding image onto a specific storage medium and making the stored image accessible via the Internet to the person different from the user of the mobile terminal.

22. The device of claim 21 wherein the information transmitting unit transmits to the mobile terminal pieces of image information corresponding to the specified images via e-mail over the Internet, and the reception unit receives, via e-mail over the Internet, the pieces of image information selected.

* * * * *